UNITED STATES PATENT OFFICE.

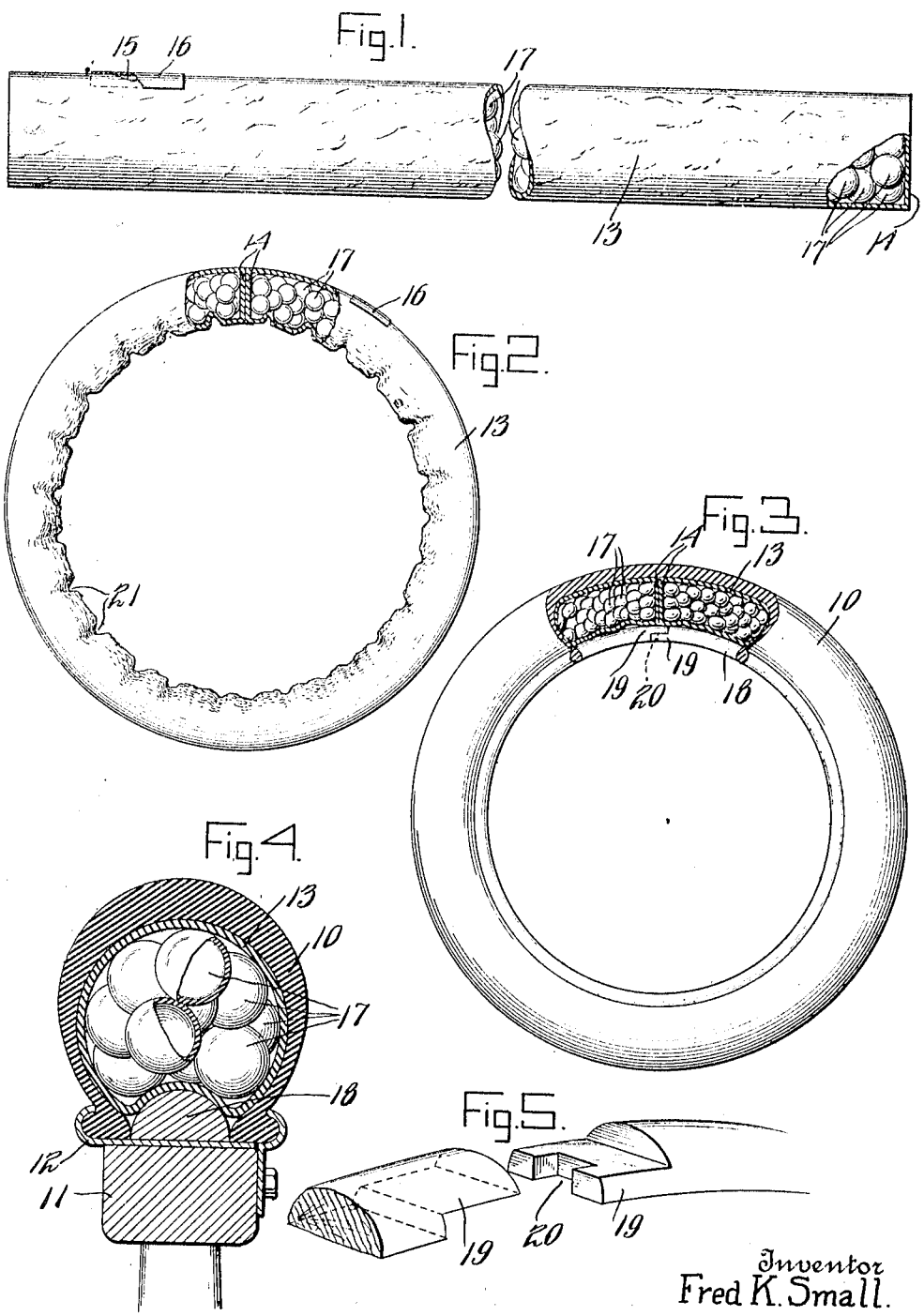

FRED K. SMALL, OF LISBON FALLS, MAINE.

PNEUMATIC TIRE.

1,313,749.     Specification of Letters Patent.     Patented Aug. 19, 1919.

Application filed April 14, 1919. Serial No. 289,866.

*To all whom it may concern:*

Be it known that I, FRED K. SMALL, a citizen of the United States, residing at Lisbon Falls, in the county of Androscoggin and State of Maine, have invented certain new and useful Improvements in Pneumatic Tires, of which the following is a specification.

My said invention relates to tires and more particularly to a pneumatic tire which does not require to be inflated and one which will not become materially deflated should a puncture occur. All as will be hereinafter more fully described and claimed.

Referring to the accompanying drawings which are made a part hereof, and on which similar reference characters indicate similar parts, Figure 1 is an elevation of an inner casing containing hollow balls, parts being broken away to more clearly illustrate the structure, Fig. 2, an elevation of the same rolled to form a ring and clearly illustrating the wrinkles formed by the rolling.

Fig. 3, an elevation of a tire broken away to show an inner casing of my improved form mounted therein.

Fig. 4, a cross section through the felly and tire of a wheel, and

Fig. 5, a detail perspective view of the meeting ends of the compression ring.

In the drawings the numeral 10 denotes the ordinary form of demountable shoe and 11 the felly of an ordinary wheel, which carries any suitable form of rim 12 for holding the tire.

Mounted within the shoe 10 is a casing 13 of rubber, or other suitable material, cylindrical in cross-section when filled and of a length sufficient to entirely fill the shoe when placed with its ends abutting one another. The casing 13 is closed at its ends as at 14 and is provided adjacent one of its ends with an opening 15 normally closed by means of a flap 16. Into this opening 15 is inserted a series of hollow inflated rubber balls 17 of sufficient strength to withstand the compression necessary for its use in an automobile tire. These balls are entirely sealed so that no air can escape therefrom under ordinary conditions. The casing 13 is completely filled with the balls 17, then bent as shown in Fig. 2, inserted within the casing 10 and then put under additional pressure by means of a pressure ring 18 which is interposed between the inner edges of the shoe and between the rim 12 and said inner tube 13. Said pressure ring is formed with overlapping ends 19, one of which is provided with a notch 20 in its end to receive a tool to pry the ends apart and facilitate the removal of said ring.

When the casing 13 has been completely filled with the balls 17 and bent as shown in Fig. 2 of the drawing a series of wrinkles or creases 21 will be formed upon its inner surface which puts an initial pressure on the balls. When the tire and casing 13 have been assembled as shown in Fig. 3 with the ring 18 mounted therein, and the whole mounted within the rim 12 of the wheel which retains the ring 18 the balls 17 are put under additional pressure by said ring 18 serving to take up any slack in casing 13 and press said balls together and put them under pressure sufficient to hold the shoe 10 in a firm condition.

It will also be readily seen that should a puncture occur, only one, or possibly two, of the balls, will become punctured, which will not materially affect the elasticity of the tire or allow the tire to be flattened to such a degree that rim cuts would be possible.

Having thus fully described my said invention, what I claim as new and desire to secure by Letters Patent, is:

1. A pneumatic tire comprising an outer shoe, an inner casing closed at its ends, hollow flexible balls within said casing, and a pressure ring between the wheel rim and inner casing adapted to compress said balls, substantially as set forth.

2. A pneumatic tire comprising an outer shoe, an inner casing of sufficient length to fill said shoe with closed ends and an opening to receive balls, compressible hollow balls within and completely filling said casing, and means for compressing said balls and casing after mounting in said shoe, substantially as set forth.

3. The combination, of the outer shoe of a pneumatic tire, an inner casing completely filled with hollow compressible balls, a circular ring adapted to be expanded against said casing and balls and having overlapping ends to lock it in the expanded position, substantially as set forth.

4. A pneumatic tire comprising an outer shoe, an inner casing completely filled with hollow compressible balls, a circular ring adapted to be expanded against said casing and balls and when expanded being of a larger circumference than the inner circumference of said casing, and overlapping ends on said ring to lock it in the expanded position, substantially as set forth.

5. A pneumatic tire comprising an outer shoe, an inner tube filled with inflated balls, and an expander ring mounted between the rim of the wheel and said inner tube, substantially as set forth.

In witness whereof, I, have hereunto set my hand and seal at Dover, N. H., this eighth day of April, A. D. nineteen hundred and nineteen.

FRED K. SMALL. [L. S.]

Witnesses:
 BERTHA M. BOYLE,
 E. J. GALLOWAY.